Jan. 5, 1943.  W. EWALD ET AL  2,307,205
MAGNET SYSTEM
Filed April 19, 1941
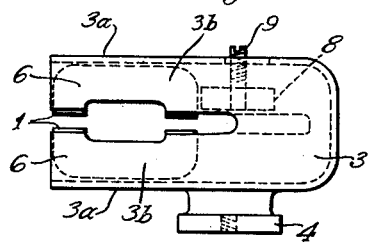
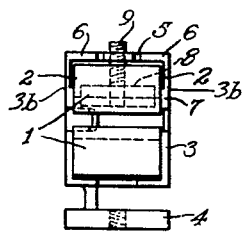
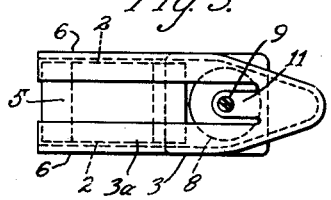
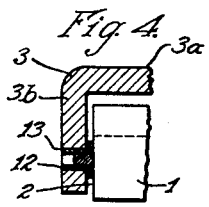
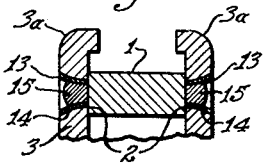
WITNESSES:
E. F. Oberheim
C. L. Freedman
INVENTORS
Wilhelm Ewald,
Paul Paschen & Josef Uffinger.
BY
ATTORNEY

UNITED STATES PATENT OFFICE 2,307,205

MAGNET SYSTEM

Wilhelm Ewald, Paul Paschen, and Josef Uffinger, Nuremberg, Germany, assignors to Westinghouse Electric & Manufacturing Company, East Pittsburgh, Pa., a corporation of Pennsylvania Application April 19, 1941, Serial No. 389,400
In Germany November 16, 1939

1 Claim. (Cl. 175—21)

This invention relates to permanent magnets, and it has particular relation to permanent damping magnets for electrical meters.

In the prior art, such magnets have been supported by U-shaped sheet metal laps which are bent around the yokes of the magnets. Such supports, however, are objectionable because the magnet materials tend to break when the laps are being bent around the yokes. Permanent magnet material now employed is extremely brittle. Since such permanent magnets cannot be constructed accurately to predetermined dimensions, and since they cannot be readily machined, the attachment of such magnets to their supports by screws, spraying, and similar methods is not satisfactory.

In accordance with the invention, permanent magnets are supported by a supporting structure having two spaced U-sections positioned with their flanges extending towards each other. If desired, each U-section may be sub-divided by a longitudinal slot into two L-sections for the purpose of increasing the resiliency of the flanges.

Preferably, the permanent magnets are attached to the supporting structure by a suitable adhesive, such as cement or solder. The introduction of the adhesive may be facilitated by providing openings in the flanges of the supporting structure. If solder is employed, the openings may be lined with a solderable material, such as brass.

It is, therefore, an object of the invention to provide an improved supporting structure for permanent magnets.

It is a further object of the invention to provide a supporting structure for permanent magnets which includes spaced U-shaped sections having their flanges extending towards each other.

It is a further object of the invention to provide improved means for attaching permanent magnets to their supporting structures.

Other objects of the invention will be apparent from the following description taken in conjunction with the accompanying drawing, in which:

Figure 1 is a view in side elevation of a permanent magnet system or assembly embodying the invention;

Fig. 2 is a view in end elevation of the permanent magnet system or assembly illustrated in Fig. 1;

Fig. 3 is a view in top plan of the permanent magnet system or assembly illustrated in Fig. 1; and Figs. 4 and 5 are detailed views showing means for attaching permanent magnets to their supporting structures.

Referring to the drawing, Fig. 1 shows a pair of spaced permanent magnets 1 which may be of U-shape. If desired, one of the permanent magnets 1 may be replaced by a magnetic body, such as soft iron for forming a return path for magnetic flux produced by the remaining permanent magnet. Preferably, the U-shaped permanent magnets 1 have their faces 2 machined.

The permanent magnets 1 are mounted in a supporting structure 3 having two spaced opposed U-sections 3a provided with spaced flanges 3b. If desired, the supporting structure may include a pedestal or foot 4 by which the supporting structure may be attached to any desired base. If desired, each of the U-sections 3a may be divided by means of a slot 5 into two angles or L-sections 6. Furthermore, if desired, each of the U-sections may be recessed to provide narrow supporting surfaces 7 for engaging the faces 2 of the permanent magnets.

The supporting structure 3 may be formed by pressing or bending sheet metal. Generally, however, it is preferable to form the supporting structure 3 by die casting suitable die casting material.

In assembling the permanent magnets 1 in the supporting structure 3, the permanent magnets are introduced between the flanges 3b of the U-sections 3a. Because of the presence of the slot 5, the flanges 3b have a measure of resiliency tending to hold the permanent magnets in position. Before final attachment of the permanent magnets the magnets may be moved relatively to the flanges 3b in order to provide the proper spacing and location thereof. Such spacing may be determined by a ruler or suitable spacer. After the permanent magnets have been properly located a suitable adhesive such as a cement or solder may be applied for permanently attaching the permanent magnets to the supporting structure 3.

For adjusting the magnetic field produced by the permanent magnets 1, a soft iron body 8 may be positioned between the flanges 3b of one of the U-shaped sections. This iron body is carried by a machine screw 9 which, in turn, is positioned in a threaded opening provided in an extension 11 of the supporting structure 3. By rotation of the screw 9, the iron body 8 may be moved vertically to adjust the magnetic field produced by the permanent magnets 1.

Entry of the adhesive material employed for attaching the permanent magnets to the supporting structure 3 may be facilitated by providing openings 12 in the flanges 3b. If solder is to be employed for attaching purposes, the openings 12 may be lined with a solderable material, such as brass 13. The linings 13, if desired, may be applied by spraying. After the permanent magnets 1 are in position, solder may be introduced in the openings 12 to attach the permanent magnets 1 to the lining 13.

In Fig. 5, the flanges 3a are provided with openings 14 of slightly different tapering shape. Solderable linings 13 also are employed in Fig. 5 for conditioning the flanges 3a for a soldering operation. When solder 15 is introduced in the openings 14, the permanent magnets 1 are firmly attached to the solderable lining 13.

It will be noted that the permanent magnets 1 are substantially protected on all sides by the supporting structure 3.

Although the invention has been described with reference to certain specific embodiments thereof, the invention is to be restricted only by the appended claim when interpreted in view of the prior art.

We claim as our invention:

In a magnetic assembly, a pair of U-shaped permanent magnets having opposed, spaced pole faces for establishing a magnetic field therebetween, a supporting structure for said permanent magnets including a pair of opposed, U-shaped resilient supporting members having flanges extending towards each other, the flanges on each of said supporting members being positioned to engage opposite U-shaped sides of a separate one of said permanent magnets, and adhesive bonding means securing said permanent magnets to their respective supporting members, each of said supporting members having a slot positioned between the flanges thereof for defining two angle sections tending to hold resiliently the associated permanent magnet in position.

WILHELM EWALD.
PAUL PASCHEN.
JOSEF UFFINGER.